M. A. WEAVER.
DRAINING ATTACHMENT FOR SINKS.
APPLICATION FILED JULY 23, 1910.
1,026,537.
Patented May 14, 1912.
2 SHEETS—SHEET 1.
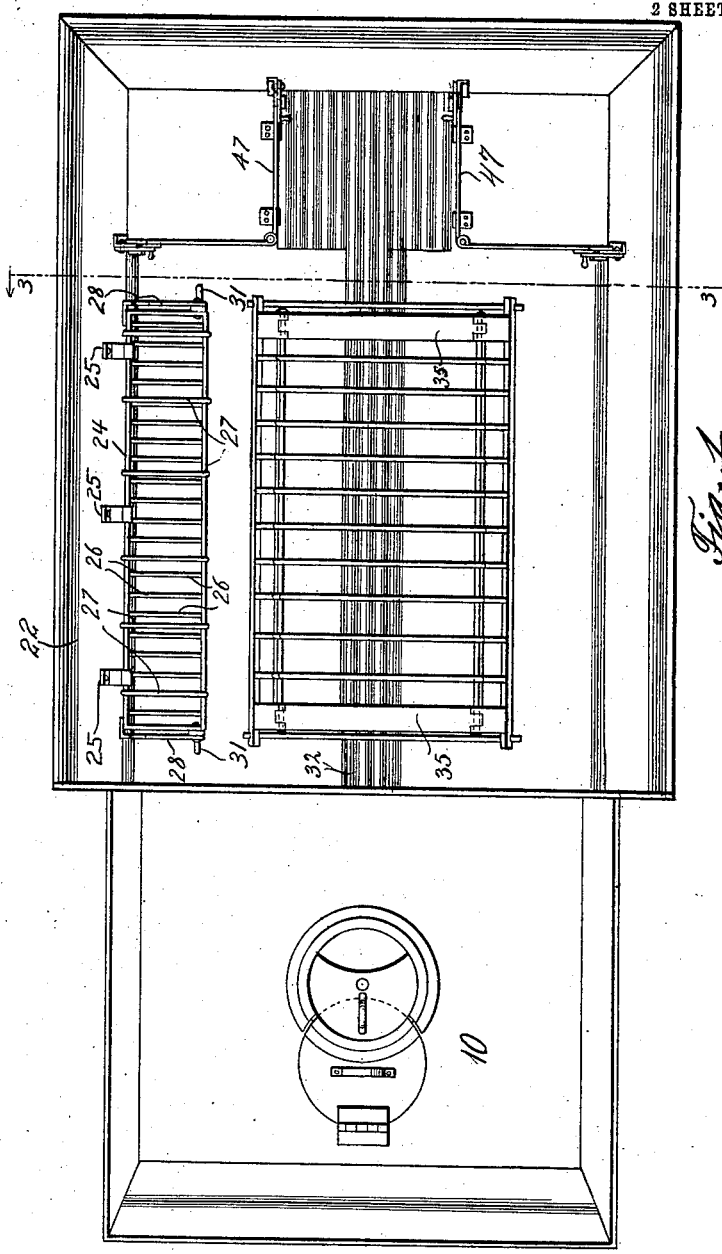

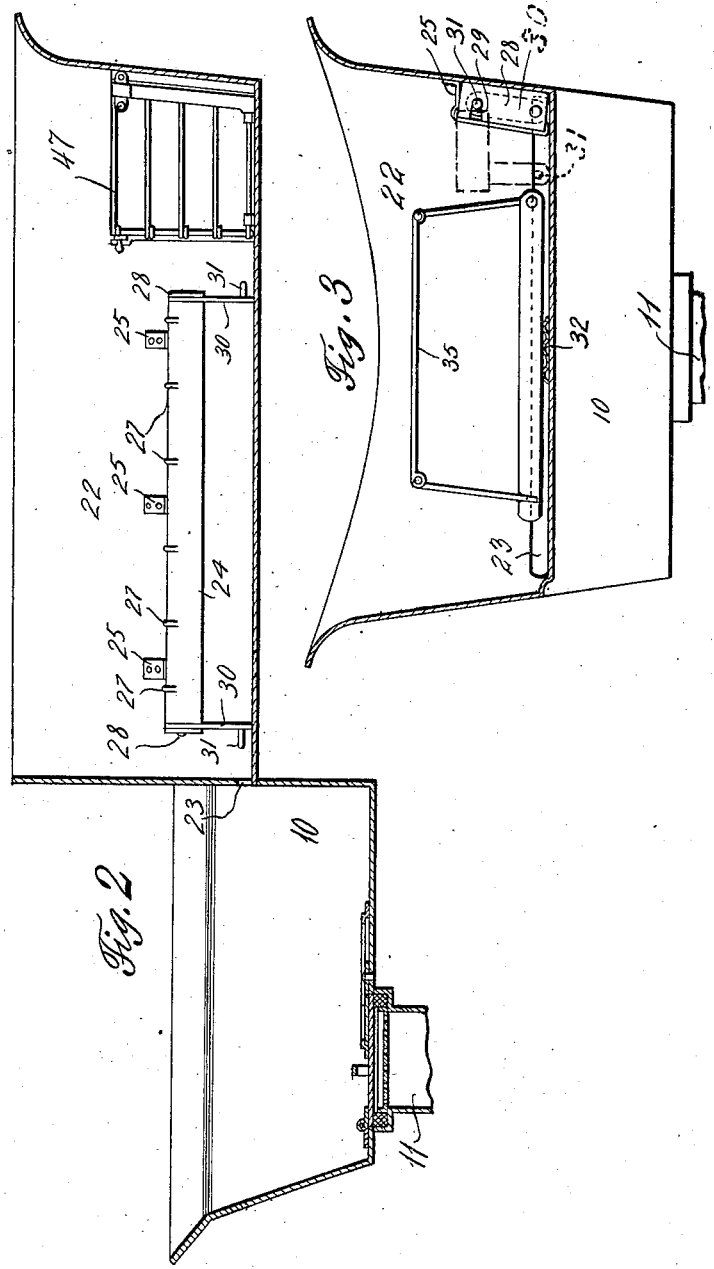
M. A. WEAVER.
DRAINING ATTACHMENT FOR SINKS.
APPLICATION FILED JULY 23, 1910.
1,026,537.
Patented May 14, 1912.
2 SHEETS—SHEET 2.

UNITED STATES PATENT OFFICE.

MARY A. WEAVER, OF DALHART, TEXAS.

DRAINING ATTACHMENT FOR SINKS.

1,026,537.

Specification of Letters Patent.

Patented May 14, 1912.

Application filed July 23, 1910. Serial No. 573,580.

*To all whom it may concern:*

Be it known that I, MARY A. WEAVER, a citizen of the United States, residing at Dalhart, in the county of Dallam and State of Texas have invented certain new and useful Improvements in Draining Attachments for Sinks, of which the following is a specification.

The present invention appertains primarily to sinks such as ordinarily used in kitchens of houses, and embodies essentially certain novel improvements in rack attachments for use in connection with a sink and adapted to support cups, and similar dishes in such a manner as to facilitate rinsing and draining of the rinsing water in the operation of washing such dishes.

The invention involves the provision of a rack of the above class which is constructed especially with a view of permitting folding of the same so that when not in use, the rack may be adjusted or folded out of the way.

For a full understanding of the present invention, reference is to be had to the following description and to the accompanying drawings, in which—

Figure 1 is a plan view showing a sink having the invention applied thereto. Fig. 2 is a vertical longitudinal sectional view of the sink, the cup rack being illustrated in operative position. Fig. 3 is a transverse sectional view on the line 3—3 of Fig. 1, the cup rack being illustrated in full lines in its folded position, and dotted lines showing the disposition of the rack when in use.

Throughout the following detail description and on the several figures of the drawings, similar parts are referred to by like reference characters.

The improved sink and dish draining apparatus forming the subject-matter of the present invention embodies a main sink or receptacle, at one end of which is preferably located the draining or washing sink, the latter occupying an elevated position and being of such a construction as to admit of arrangement therein of any suitable number of racks, such as comprise the invention, together with other racks that may be employed for holding large dishes, knives, and forks, and the like.

Referring to the drawings, 10 denotes a washing sink which is provided at its bottom with a drain opening and connection 11. At one end of the sink 10 is located the elevated drying and rinsing sink 22, the latter being provided with an opening 23 adjacent to one extremity, whereby the rinsing liquid may pass from the sink 22 into the sink 10 and off through the drain 11.

Arranged in the sink 22 is a rack of special construction adapted to support cups and similar dishes during the rinsing operation and to hold said dishes in such a manner as to permit a free circulation of air therethrough by which to facilitate drying. The rack above referred to is denoted at 24 and comprises a frame pivoted to the adjacent side of the sink 22 by the hinges 25. The frame or body of the rack 24 has a plurality of cross bars 27 spanning the same at its upper portion and forming spacing members adapted to separate the cups or dishes when arranged upon the rack. At the ends of the rack 24, auxiliary plates 28 are provided and formed with recesses 29. Supporting legs 30 for the rack are pivoted between the ends of the same and said plates 28 and the free ends of said legs are adapted to rest upon the bottom of the sink 22 when the rack is disposed in on operative position, as shown in Figs. 1 and 2. The bottom of the rack 24 is constituted by a number of spaced bars 26 upon which the dishes will directly rest when supported in position for rinsing, draining and drying.

It will be apparent that the rack 24 is supported in a horizontal position by the legs 30 when said rack is in use. After the rack has been used, it may be folded so as to occupy a nearly vertical position, as shown in Fig. 3, by merely raising the legs 30 through manipulation thereof by the finger pieces 31, thereby permitting the frame of the rack to move downwardly against the adjacent side of the sink 22. In order that the legs 30 may be disposed out of the way, they are moved pivotally in the above folding operation to carry them between the ends of the rack 24 and the plates 28, the recesses 29 receiving the finger pieces or handles 31 to permit of such disposition of the legs.

If desired, the bottom of the sink 22 may be provided with the longitudinal corrugations 32, upon which may rest a plate rack 35 occupying the middle portion of the sink 22, the end portion of the sink 22 remote from the sink 10 being adapted to support a rack 47 in which spoons, knives, and similar metal articles may be supported.

Having thus described the invention, what is claimed as new is:

1. In combination, a draining sink, and a rack arranged therein adjacent to a side thereof and comprising a frame, pivotal connections between the outer side of said frame and the adjacent side of the sink, said rack being provided with spaced bars to support cups and similar dishes, legs pivotally connected at corresponding ends to the opposite end portions of the rack and adapted to engage the bottom of the sink at their opposite ends to support the rack in operative position, said legs being foldable against the ends of the rack to permit the latter to move downwardly into an inoperative position in relation to the sink.

2. In combination, a draining sink and a rack arranged therein comprising a frame and a plurality of spaced bars to receive cups and similar dishes therebetween to support the same, plates at the opposite ends of the rack and provided with recesses, legs pivotally connected at corresponding ends to the ends of the rack and arranged upon the inner sides of said plates, finger pieces projecting outwardly from the opposite ends of the legs, said legs being movable into vertical positions supporting the rack in an operative horizontal position and being also movable so as to rest against the inner sides of the aforesaid plates to permit the rack to remain in an inoperative or vertical position, the finger pieces aforesaid being movable into the recesses of the plates when the legs are inoperative with respect to the rack.

In testimony whereof I affix my signature in presence of two witnesses.

MARY A. WEAVER.

Witnesses:
W. W. MOORE,
Mrs. W. W. MOORE.

---

Copies of this patent may be obtained for five cents each, by addressing the "Commissioner of Patents Washington, D. C."